United States Patent
Kim

(10) Patent No.: US 8,860,264 B2
(45) Date of Patent: Oct. 14, 2014

(54) LINEAR VIBRATOR

(75) Inventor: Jin Hoon Kim, Gyunggi-do (KR)

(73) Assignee: Samsung Electro-Mechanics Co., Ltd., Suwon, Gyunggi-Do (KR)

( * ) Notice: Subject to any disclaimer, the term of this patent is extended or adjusted under 35 U.S.C. 154(b) by 62 days.

(21) Appl. No.: 13/600,961

(22) Filed: Aug. 31, 2012

(65) Prior Publication Data

US 2013/0057088 A1     Mar. 7, 2013

(30) Foreign Application Priority Data

Sep. 5, 2011 (KR) .................. 10-2011-0089605

(51) Int. Cl.
*H02K 35/00* (2006.01)

(52) U.S. Cl.
USPC ............................................. 310/25; 310/71

(58) Field of Classification Search
USPC .................... 310/25, 71, 81, 12.16
See application file for complete search history.

(56) References Cited

U.S. PATENT DOCUMENTS

| | | | | |
|---|---|---|---|---|
| 6,810,128 B2* | 10/2004 | Kaneda et al. | ............... | 381/396 |
| 2005/0184601 A1 | 8/2005 | Kweon et al. | | |
| 2006/0001324 A1* | 1/2006 | Won et al. | ................ | 310/81 |
| 2006/0202566 A1* | 9/2006 | Osaka | ....................... | 310/12 |
| 2007/0194633 A1* | 8/2007 | Ueda et al. | .................... | 310/15 |
| 2007/0194635 A1* | 8/2007 | Miura | ............................ | 310/15 |
| 2009/0121559 A1* | 5/2009 | Lee | ................................. | 310/28 |
| 2010/0277009 A1* | 11/2010 | Jeon | ................................. | 310/25 |
| 2011/0062801 A1 | 3/2011 | Choi et al. | | |
| 2011/0193426 A1 | 8/2011 | Chung et al. | | |
| 2012/0119595 A1* | 5/2012 | Choi et al. | ..................... | 310/25 |

FOREIGN PATENT DOCUMENTS

| | | |
|---|---|---|
| CN | 102025254 A | 4/2011 |
| KR | 10-0593900 | 6/2006 |
| KR | 2006-0134586 A | 12/2006 |
| KR | 2011-0006519 A | 1/2011 |

OTHER PUBLICATIONS

Korean Office Action, and English translation thereof, issued in Korean Patent Application No. 10-2011-0089605 dated Dec. 18, 2012.
Chinese Office Action issued in Chinese Application No. 201110395991.4 issued Jun. 6, 2014, with English Translation.

* cited by examiner

*Primary Examiner* — Thanh Lam
(74) *Attorney, Agent, or Firm* — McDermott Will & Emery LLP

(57) ABSTRACT

There is provided a linear vibrator, including a fixed part having an inner space of a predetermined size formed therein; at least one magnet disposed in the inner space and generating magnetic force; a vibration part including a coil disposed to face the magnet to generate electromagnetic force through interaction therewith, and a mass body; a substrate having one end connected to the vibration part to serve as a free end, and the other end connected to the fixed part to serve as a fixed end; and a connection protrusion formed on the fixed part and inserted into a connection hole formed in the substrate so as to allow the substrate to be fixed to the fixed part.

7 Claims, 11 Drawing Sheets

LINEAR VIBRATOR

CROSS-REFERENCE TO RELATED APPLICATIONS

This application claims the priority of Korean Patent Application No. 10-2011-0089605 filed on Sep. 5, 2011, in the Korean Intellectual Property Office, the disclosure of which is incorporated herein by reference.

BACKGROUND OF THE INVENTION

1. Field of the Invention

The present invention relates to a linear vibrator, and more particularly, to a linear vibrator mounted in a mobile electronic device and applied to an apparatus for generating a soundless reception signal.

2. Description of the Related Art

In recent years, personal mobile terminals having large LCD screens have increased for the sake of user convenience. Accordingly, a touch screen method is adopted therein, and a vibration motor is used to generate vibrations when the touch screen is touched.

The vibration motor is an element that converts electrical energy into mechanical vibrations using the principle of generating electromagnetic force, and is mounted in a personal mobile terminal and used to inform a user of a soundless reception signal.

A vibration motor according to the related art generates mechanical vibrations by generating rotational force to rotate a rotation unit of unbalanced mass, the rotational force undergoing a rectifying action through a contact point between a brush and a commutator, thereby generating mechanical vibrations.

However, in such a brush type configuration using a commutator, the brush may cause mechanical friction and electrical sparks when passing through a gap between segments of the commutator during rotation of the motor, and may generate foreign substances, thereby shortening a lifespan of the motor.

Also, it may take a great deal of time to reach a target amount of vibrations, due to rotational inertia when voltage is applied to the motor, and thus, there may be a limitation in realizing suitable touch screen vibrations.

In order to overcome these disadvantages of motor lifespan and response, and realize a vibrating function in the touch screen, a linear vibrator is commonly used.

A linear vibrator does not use the rotating principle of the motor, and may periodically generate electromagnetic force through a spring installed in the linear vibrator and a mass body suspended from the spring according to a resonant frequency to cause resonance, thereby generating vibrations.

Such a linear vibrator needs to be slim and effectively manufactured according to current market trends toward miniaturization and slimness in mobile electronic devices. In addition, a linear vibrator should not affect the performance and characteristics thereof, even in a case in which several factors are involved.

However, a linear vibrator according to the related art may cause a change in the performance and characteristics thereof due to elements that vibrate therein, and as a result, may affect the performance of a mobile electronic device employing the linear vibrator.

Accordingly, there is an urgent demand for research into a linear vibrator that does not cause a change in the performance and characteristics thereof, even with elements vibrating therein.

SUMMARY OF THE INVENTION

An aspect of the present invention provides a linear vibrator allowing for miniaturization and slimness thereof by changing configurations of a coil and a magnet generating electromagnetic force for vibrations, while having no change in performance and characteristics thereof due to elements vibrating therein.

According to an aspect of the present invention, there is provided a linear vibrator, including: a fixed part having an inner space of a predetermined size formed therein; at least one magnet disposed in the inner space and generating magnetic force; a vibration part including a coil disposed to face the magnet to generate electromagnetic force through interaction therewith, and a mass body; a substrate having one end connected to the vibration part to serve as a free end, and the other end connected to the fixed part to serve as a fixed end; and a connection protrusion formed on the fixed part and inserted into a connection hole formed in the substrate so as to allow the substrate to be fixed to the fixed part.

The connection protrusion may include a locking portion protruding outwardly of the connection hole.

The connection protrusion may include an insertion portion placed in the connection hole, and a locking portion bent from an end of the insertion portion in an inner diameter direction or an outer diameter direction by a predetermined angle, and protruding outwardly of the connection hole.

The locking portion may be wider than the connection hole, to prevent the substrate from being separated from the fixed part.

The connection hole may have a circular, polygonal, cross-shaped, or linear cross section in a radial direction.

The substrate may include a movable piece vibrating in association with the vibration part and a fixed piece extending from the movable piece to be connected with the fixed part, and the connection hole may be formed in the fixed piece.

The fixed part may include a case providing the inner space and having an exposed lower portion, and a bracket sealing the inner space, and the magnet may be connected with one surface of the bracket or one surface of the case.

The fixed part may include a case providing the inner space and having an exposed lower portion and a bracket sealing the inner space, and the magnet may be provided in plural, each of the plurality of magnets being connected with one surface of the case or one surface of the bracket.

The linear vibrator may further include a damper connected to one surface of the substrate to prevent contact between the vibration part and the fixed part due to a vibration of the vibration part.

The linear vibrator may further include a yoke plate formed on at least one surface of the magnet and allowing a magnetic flux to smoothly flow into the magnet through the coil.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE INVENTION

Figure 1:
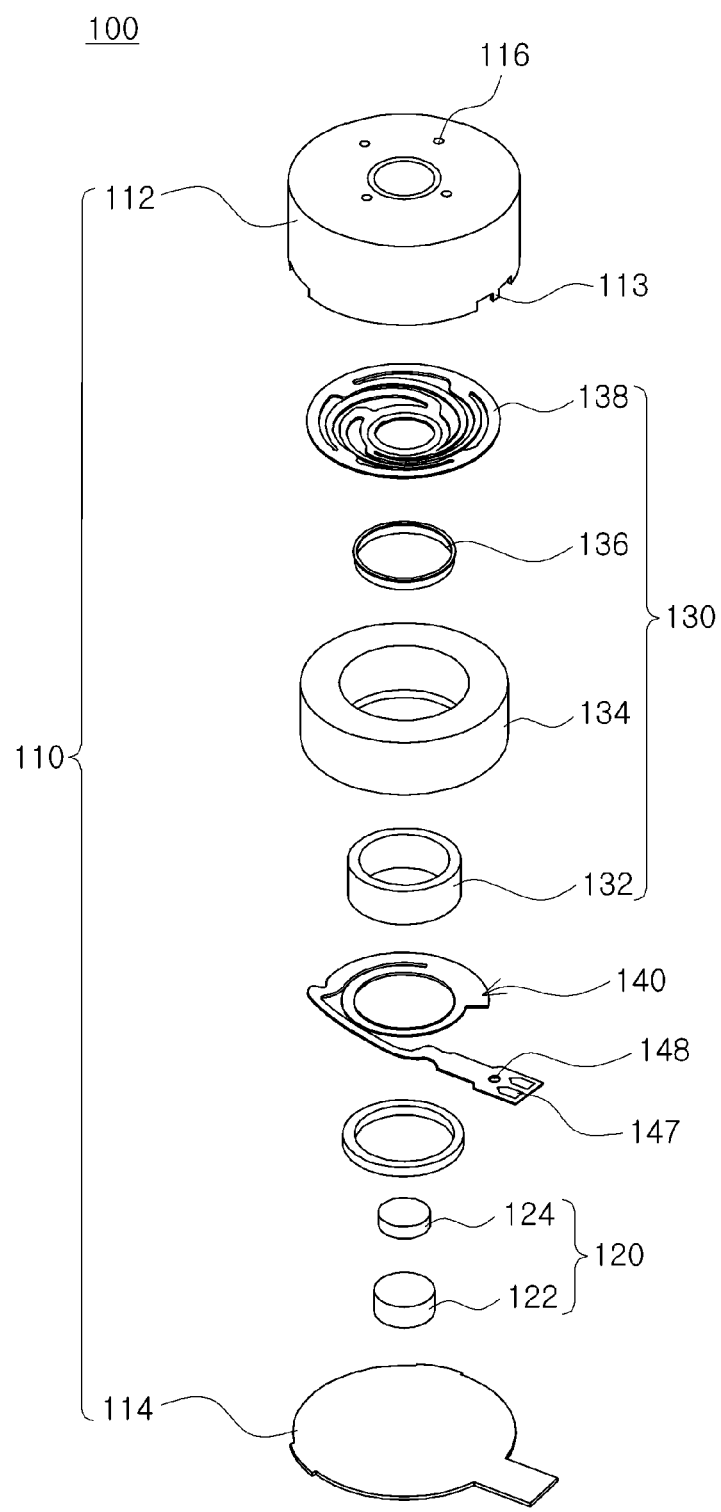
FIG. 1 is a schematic exploded perspective view illustrating a linear vibrator according to an embodiment of the present invention.

Embodiments of the present invention will now be described in detail with reference to the accompanying drawings. However, it should be noted that the spirit of the present invention is not limited to the embodiments set forth herein and those skilled in the art and understanding the present invention could easily accomplish retrogressive inventions or other embodiments included in the spirit of the present invention by the addition, modification, and removal of components within the same spirit, but those are to be construed as being included in the spirit of the present invention.

Further, throughout the drawings, the same or similar reference numerals will be used to designate the same or like components having the same functions in the scope of the similar idea.

Figure 2:
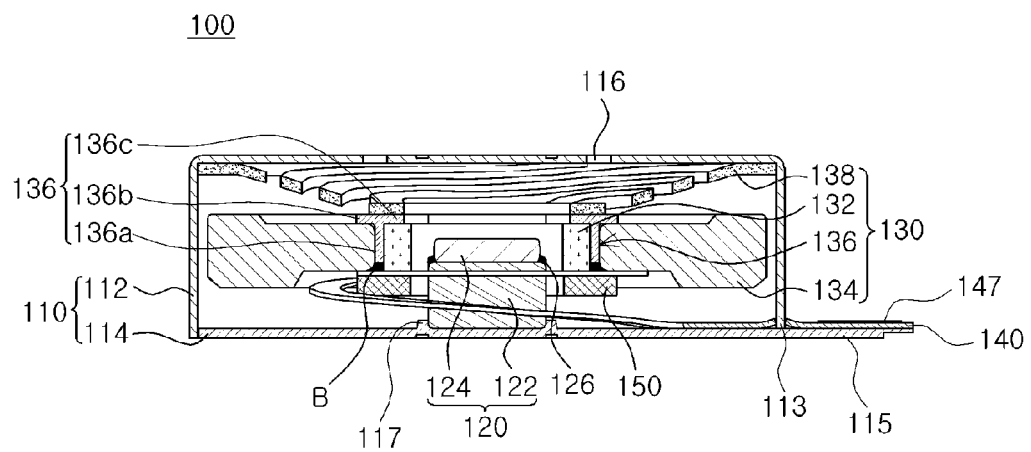
FIG. 2 is a schematic cross sectional view illustrating the linear vibrator according to the embodiment of the present invention.
Figure 3:
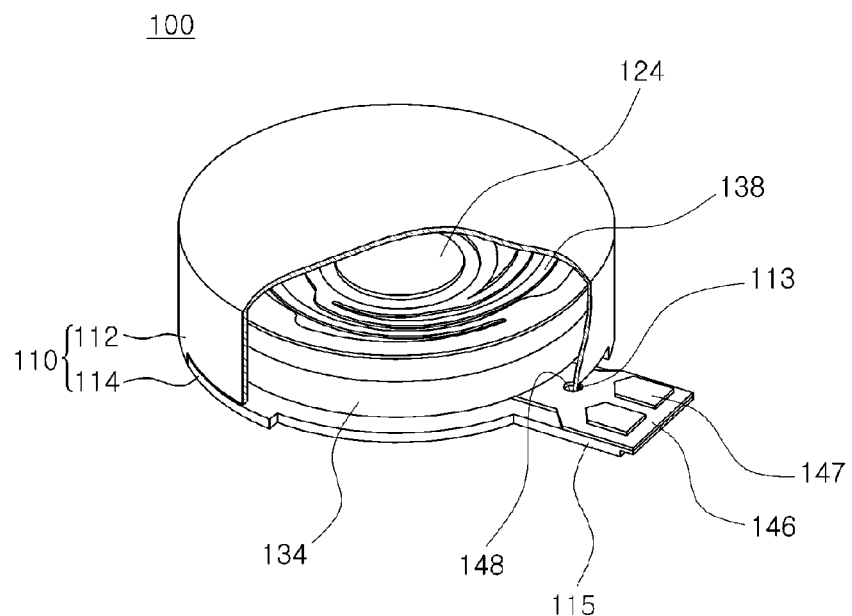
FIG. 3 is a schematic cutaway perspective view illustrating the linear vibrator according to the embodiment of the present invention.

FIG. 1 is a schematic exploded perspective view illustrating a linear vibrator according to an embodiment of the present invention. FIG. 2 is a schematic cross sectional view illustrating the linear vibrator according to the embodiment of the present invention. FIG. 3 is a schematic cutaway perspective view illustrating the linear vibrator according to the embodiment of the present invention.

Figure 4:
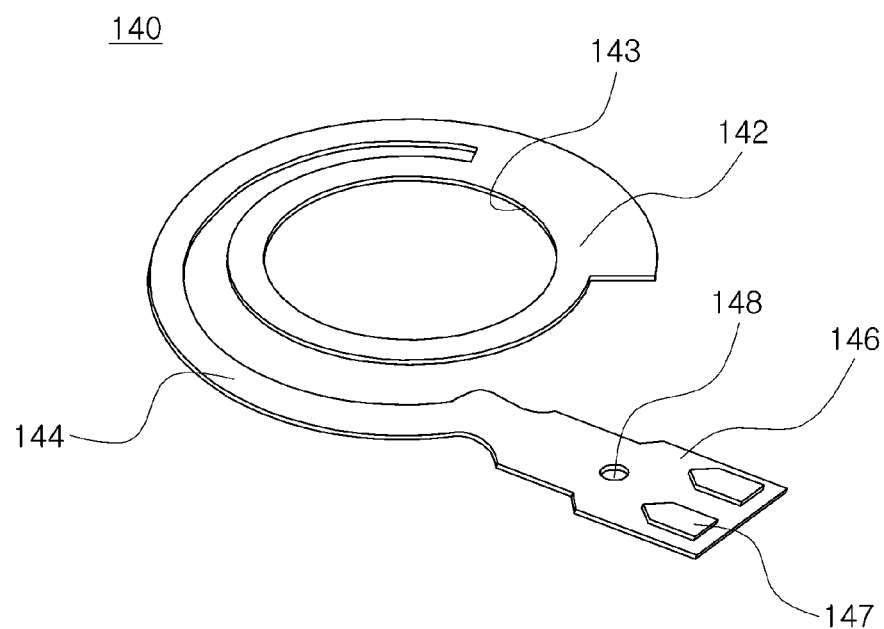
FIG. 4 is a schematic perspective view illustrating a substrate provided in the linear vibrator according to the embodiment of the present invention.
Figure 5:
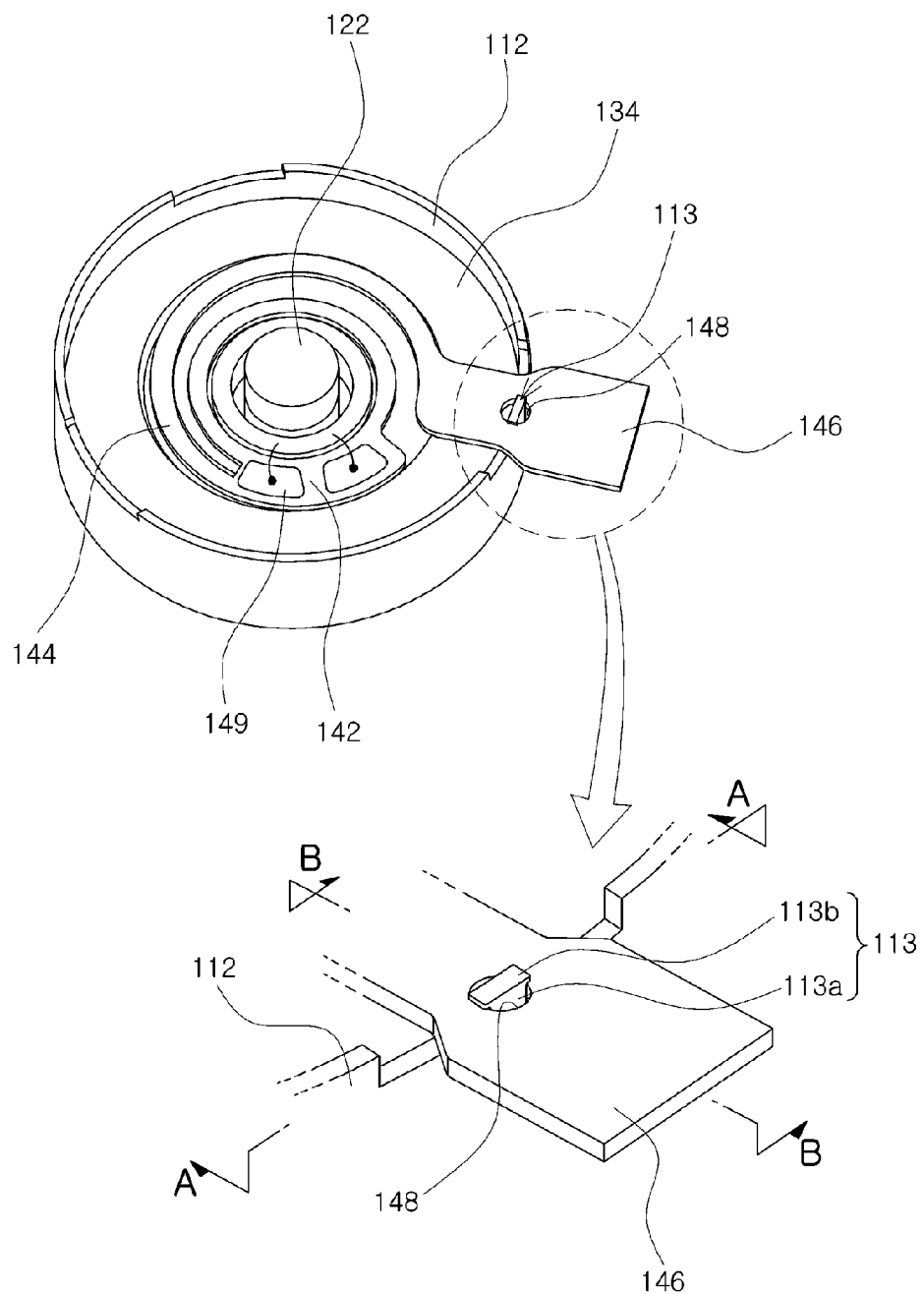
FIG. 5 is a schematic bottom perspective view illustrating the linear vibrator according to the embodiment of the present invention.
Figure 6:
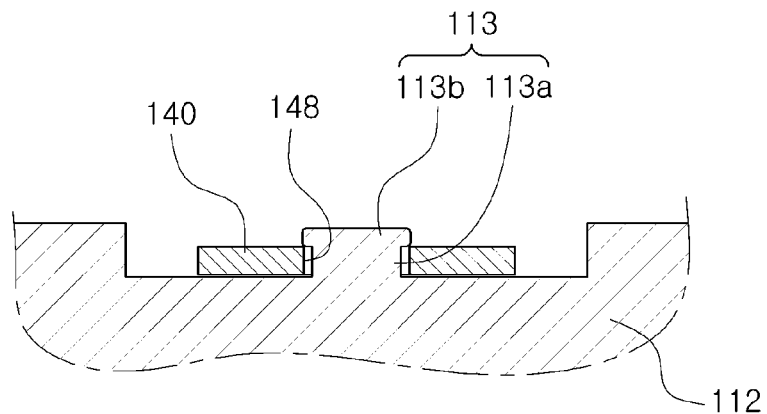
FIG. 6 is a schematic cross sectional view taken along line A-A of FIG. 5.
Figure 7:
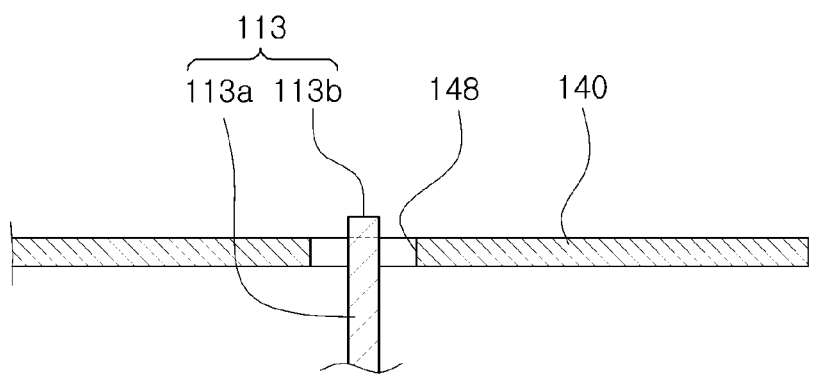
FIG. 7 is a schematic cross sectional view taken along line B-B of FIG. 5.

FIG. 4 is a schematic perspective view illustrating a substrate provided in the linear vibrator according to the embodiment of the present invention. FIG. 5 is a schematic bottom perspective view illustrating the linear vibrator according to the embodiment of the present invention. FIG. 6 is a schematic cross sectional view taken along line A-A of FIG. 5. FIG. 7 is a schematic cross sectional view taken along line B-B of FIG. 5.

First, terms with respect to directions will be defined. An outer diameter direction or an inner diameter direction may refer to a direction from a center of a case 112 toward an outer circumference thereof or vice-versa.

Referring to FIGS. 1 through 7, a linear vibrator 100 according to an embodiment of the present invention may include a fixed part 110 including a connection protrusion 113, a magnet 122 forming a magnetic field part 120, a vibration part 130 including a coil 132 and a mass body 134, and a substrate 140.

The fixed part 110 may provide an inner space of a predetermined size. More specifically, the fixed part 110 may include a case 112 having a lower portion exposed to the outside and a bracket 114 sealing the inner space formed due to the case 112.

The case 112 and the bracket 114 may form a space to accommodate the magnetic field part 120 including the magnet 122 and the vibration part 130, and the case 112 and the bracket 114 may be integrally formed with each other.

Also, at least one inlet hole 116 may be formed in an upper surface of the case 112 so as to dispose a magnetic fluid 126, to be described later, in an outer circumference of the magnet 122, and the magnetic fluid 126 may be simply applied through the inlet hole 116.

The inlet hole 116 may be a hole having a laser beam penetrating therethrough in a case in which an elastic member 138, which will be explained later, and a holder 136 of the vibration part 130 are connected to each other by welding.

The connection protrusion 113, which corresponds to a connection hole 148 formed in a fixed piece 146 of the substrate 140, may be formed in a lower end portion of the case 112 so as to fix the fixed piece 146 to the case 112.

The connection protrusion 113 is inserted into the connection hole 148, such that the substrate 140 may be stably fixed and coupled to the case 112. This will be explained in detail below.

The magnet 122 may form the magnetic field part 120 of the linear vibrator 100 according to the embodiment of the present invention along with a yoke plate 124, and the magnet 122 may be connected to an upper surface of the bracket 114 of the fixed part 110 by at least one of bonding, press-fitting, and welding.

The magnet 122 may have an outer diameter smaller than an inner diameter of the coil 132 connected to the holder 136, and may be connected to the bracket 114 to act as a fixed member.

However, the bracket 114 includes an outer wall 117 protruding from the upper surface thereof to correspond to the outer diameter of the magnet 122, and the outer diameter of the magnet 122 is insertedly fixed in an inner surface of the outer wall 117 to be more firmly connected thereto.

The yoke plate 124 may be connected to one surface of the magnet 122, that is, an upper surface of the magnet 122, so as to allow a magnetic flux to smoothly flow into the magnet 122 through the coil 132 generating electromagnetic force due to an interaction with the magnet 122.

The yoke plate 124 may be formed of a magnetic material, which allows the magnetic fluid 126 to be smoothly applied.

That is, the magnetic fluid 126 may be applied between the outer circumferences of the magnet 122 and the yoke plate 124, and the coil 132, and serve to prevent abnormal vibrations of the vibration part 130.

In other words, the magnetic fluid 126 may be placed in a gap between the magnet 122 and the coil 132 so as to allow the vibration part 130 to move smoothly in a vertical direction, and may prevent abnormal vibrations occurring due to horizontal or vertical vibrations of the vibration part 130 caused by external impacts.

The magnetic fluid 126 is a material having a property of being focused on the magnetic flux of the magnet 122, and is focused on a magnetic flux generating point of the magnet 122 to form a single ring shape when the magnetic fluid 126 is applied a surface of the magnet 122.

The magnetic fluid 126 is formed in such a manner that magnetic powder is dispersed in liquid to have a colloidal shape and a surfactant is added to the liquid to prevent deposition or agglutination of the magnetic powder due to gravity or the magnetic field. For example, the magnetic fluid 126 may be formed by dispersing triiron tetraoxide or iron-cobalt alloy particles in oil or water, and recently, may be formed by dispersing cobalt in toluene.

Such magnetic powder is an ultrafine particle powder, and due to Brownian motion which is a specific characteristic of ultrafine particles, the density of magnetic powder particles in a fluid may be constantly maintained even in a case in which external magnetic field, gravity, centrifugal force, or the like is applied thereto.

Also, the magnetic fluid 126 fills the gap between an outer surface of the magnet 122 and an inner surface of a hollow part of the coil 132, such that the vibration part 130 may smoothly vibrate or slide.

The vibration part 130 may include the coil 132 and the mass body 134, and the coil 132 and the mass body 134 may be fixed by the holder 136 and vibrations may be realized through the elastic member 138.

In other words, the vibration part 130 may vertically vibrate due to the elastic member 138.

The coil 132 may be disposed to face the magnet 122, and a part of the magnet 122 including one surface thereof may be inserted into an internal space of the coil 132.

The coil 132 may have the inner diameter larger than the outer diameter of the magnet 122, and may maintain a state of non-contact with the magnet 122 during the movement of the vibration part 130.

Also, the coil 132 may be connected to the inner surface of the hollow of the holder 136, and, when electric current is applied to the coil 132 according to a predetermined frequency, the coil 132 may induce a magnetic field therearound.

At this time, when the coil 132 excites the electromagnetic force, the magnetic flux passing through the coil 132 from the magnet 122 may be formed in a horizontal direction, and the magnetic field generated by the coil 132 may be formed in a vertical direction so that the vibration part 130 vertically vibrates.

Accordingly, the formation direction of the magnetic flux of the magnet 122 is perpendicular to the vibrating direction of the vibration part 130.

When the electromagnetic force having the same frequency as the mechanical natural frequency of the vibration part 130 is excited, the vibration part 130 resonance-vibrates and thus obtains maximal vibrations. The natural frequency of the vibration part 130 may be affected by a mass of the vibration part 130 and a modulus of elasticity of the elastic member 138.

An external power source which has electric current to be applied to the coil 132 of the vibration part 130, that is, a constant frequency, may be provided due to the substrate 140 connected to the vibration part 130, and this will be explained below.

The holder 136 is connected to the outer circumference of the coil 132 and fixedly supports the mass body 134, and may be formed to a cylindrical hollow shape in which an upper portion and a lower portion thereof are exposed.

More specifically, the holder 136 may include a vertical portion 136a having a cylindrical shape and coming into contact with surfaces of the coil 132 and the mass body 134, and outer and inner horizontal portions 136b and 136c extending from an end of the vertical portion 136a in the outer diameter and inner diameter directions and supporting the coil 132 and the mass body 134.

An outer circumference of the vertical portion 136a and a lower surface of the outer horizontal portion 136b are in contact with the mass body 134 and fixedly support the mass body 134, and an inner circumference of the vertical portion 136a and a lower surface of the inner horizontal portion 136c may fixedly support the coil 132.

Also, the holder 136 may be made of a material including iron. The holder 136 may be made of the same material as that of the elastic member 138 to obtain an easy and firm connection therebetween.

However, the material of the holder 136 and the elastic member 138 is not limited to a material including iron, and may be made of any material, as long as it may obtain an easy and firm connection.

Also, the vertical portion 136a of the holder 136 may be disposed at a position higher than those of the lower surfaces of the coil 132 and the mass body 134 in such a manner that a space is formed between the coil 132 and the mass body 134, and an adhesive B fills the space to connect the coil 132 and the mass body 134 more firmly.

The mass body 134 is a vibrating body connected to the outer surface of the vertical portion 136a of the holder 136 and the lower surface of the outer horizontal portion 136b and vibrating vertically. The mass body 134 may have an outer diameter smaller than the inner diameter of the inner surface of the case 112 in order that the mass body 134 may vibrate vertically in the fixed part 110 without contact.

Accordingly, a gap of a predetermined size may be formed between the inner surface of the case 112 and the outer surface of the mass body 134.

The mass body 134 may be made of a non-magnetic or paramagnetic material unaffected by the magnetic force generated by the magnet 122.

Accordingly, the mass body 134 may be made of a material having weight heavier than the iron such as tungsten. This is to adjust the resonant frequency by increasing a mass of the vibration part 130 in the same volume and thus maximize the amount of vibration.

However, the material of the mass body 134 is not limited to tungsten and the mass body 134 may be made of various materials, according to a designer's intention.

In order to correct the natural frequency of the linear vibrator 100, the mass body 134 may have a space formed therein, to insert a sub-mass body additionally, and accordingly, the mass of the mass body 134 may be adjusted.

The elastic member 138 provides elastic force by being connected to the holder 136 and the case 112, as described above. The modulus of elasticity of the elastic member 138 affects the natural frequency of the vibration part 130.

The elastic member 138 may be a coil spring, or a plate spring; however, it is not limited thereto and any member that can provide elastic force may be used.

The substrate 140 may be connected to one surface of the mass body 134 of the vibration part 130 and may include a penetrating hole 143 to allow the magnet 122 to pass therethrough so as not to contact the magnet 122 when the vibration part 130 vibrates.

That is, the penetrating hole 143 prevents contact between the magnet 122 and the substrate 140, and may guarantee maximal vibrations in the vibration part 130 by not limiting amplitude when the vibration part 130 vibrates or moves.

Accordingly, the linear vibrator 100 according to the embodiment of the present invention may obtain more stable linear vibrations due to the penetrating hole 143.

More specifically, the substrate 140 may be a flexible printed circuit board, and may include a movable piece 142 connected to the mass body 134 of the vibration part 130, a fixed piece 146 connected to the fixed part 110, and a connecting piece 144 connecting the movable piece 142 and the fixed piece 146 each other.

The movable piece 142 vibrating in association with the vibration part 130, may be a free end. The lower surface of the coil 132 is brought into contact with an upper surface of the movable piece 142 and connected to the movable piece 142.

An inner space of the movable piece 142 may be the penetrating hole 143 described above.

The mass body 134 may include a recess area formed to be recessed upwardly from the lower surface thereof so as to be connected to the movable piece 142.

Accordingly, the movable piece 142 is connected to the recess area, but may be directly connected to the flat lower surface of the mass body 134 without the recess area.

The fixed piece 146 may include a power connection terminal 147 to supply power to the coil 132, and may protrude outwardly from the case 112.

In other words, the fixed piece 146 may be a fixed end that protrudes outwardly from the case 112 of the fixed part 110 and simultaneously is connected to the case 112 by the connection protrusion 113 formed on the case 112.

The above elements will be explained in greater detail after all elements of the elastic member 138 have been explained.

The substrate 140 may include the connecting piece 144 to connect the movable piece 142 and the fixed piece 146. The connecting piece 144 curves from an end of the fixed piece 146 with a gap with an edge of the movable piece 142 in a circumferential direction of the movable piece 142 so that the movable piece 142 may vertically vibrate.

Also, the substrate 140 may include an electrode pad 149 disposed on a lower surface thereof to transmit an electric signal of a specific frequency to the coil 132. The electrode pad 149 may be electrically connected to a lead wire of the coil 132.

The electrode pad 149 may be formed outside the outer diameter of the coil 132, and may be electrically connected to one end of the lead wire of the coil 132 by soldering.

In other words, the electrode pad 149 is disposed on the lower surface of the movable piece 142 of the substrate 140 and connected to the lead wire of the coil 132.

Accordingly, since the lead wire of the coil 132 is connected to the electrode pad 149 of the substrate 140 outside the coil 132, there is no effect on the vibrations and movement of the linear vibrator 100 when the linear vibrator 100 is operated according to the embodiment of the present invention.

The movable piece 142 may include a damper 150 disposed on a lower surface thereof to prevent contact between the vibration part 130 and the bracket 114 of the fixed part 110 caused by the vibrations of the vibration part 130.

The damper 150 may be made of an elastic material to prevent the contact caused by the linear movement of the vibration part 130, and may prevent touch noise, occurring when the vibration part 130 is brought into contact with the bracket 114 by excessive vibrations of the vibration part 130, and at the same time, prevent abrasion of the vibration part 130.

The damper 150 may be made of various materials that may absorb shock, such as rubber, cork, propylene, or phorone, so as to absorb external impacts, if any.

The substrate 140 including the movable piece 142, the connecting piece 144, and the fixed piece 146 may include the connection hole 148 to be connected to the case 112 of the fixed part 110.

The connection hole 148 may have a circular cross section in a radial direction, and correspond to the connection protrusion 113 formed on the case 112. The connection protrusion 113 is inserted into the connection hole 148 so that the substrate 140 is connected to the case 112 of the fixed part 110.

The substrate 140 is fixed to a protrusion 115 of the bracket 114 of the fixed part 110 by an adhesive to supply power to the coil 132. However, when external impacts are applied to the substrate 140, an initial position of the substrate 140 may be changed and thus there may be a problem in the linear vibrations of the vibration part 130.

In order to solve this problem, the substrate 140 needs to secure fixing force with the bracket 114 or the case 112 of the fixed part 110. In the linear vibrator 100 according to the embodiment of the present invention, this problem may be solved by using the connection protrusion 113 formed on the case 112 and the connection hole 148 formed in the substrate 140.

That is, the connection protrusion 113 protrudes from a lower end of the case 112, which is a member of the fixed part 110, and the connection hole 148 is formed in the fixed piece 146 of the substrate 140 to correspond to the connection protrusion 113.

First, before the fixed piece 146 of the substrate 140 is connected to the protrusion 115 of the bracket 114, which is one of the members of the fixed part 110, by the adhesive, the connection protrusion 113 formed on the case 112 is inserted into the connection hole 148 formed in the fixed piece 146 and fixed in position.

The connection protrusion 113 may include an insertion portion 113a to be inserted into the connection hole 148 of the substrate 140 and a locking portion 113b penetrating to the outside of the connection hole 148.

The insertion portion 113a may be a portion placed in the connection hole 148.

The locking portion 113b may have a width wider from an end of the insertion portion 113 and may be wider than a diameter of the connection hole 148. Therefore, after the connection protrusion 113 is inserted into the connection hole 148, the substrate 140 is prevented from being separated from the case 112 by the locking portion 113b.

When the connection protrusion 113 including the locking portion 113b is inserted into the connection hole 148, the connection hole 148 may be elastically deformed to have a larger diameter due to the characteristic of the substrate 140, that is, the characteristic of the flexible printed circuit board. Therefore, there is no problem in passing the locking portion 113b having a diameter, larger than that of the connection hole 148, through the connection hole 148.

Accordingly, after fixing the substrate 140 to the case 112 by inserting the connection protrusion 113 formed on the case 112 into the connection hole 148 formed in the fixed piece 146 of the substrate 140, when the fixed piece 146 of the substrate 140 is bonded to the protrusion 115 of the bracket 114 by the adhesive, the fixing force between the substrate 140 and the fixed part 110 may be maximized.

Therefore, even in a case in which external impacts are applied to the substrate 140, the initial position of the substrate 140 is not changed and thus the vibration performance and characteristics of the linear vibrator 100 according to the embodiment of the present invention are not affected by the vibration of the substrate 140, a vibrating element.

Also, before the substrate 140 is bonded to the protrusion 115 of the bracket 114 of the fixed part 110, the bonding position is already determined by the connection protrusion 113 of the case 112 and the connection hole 148 of the substrate 140, so that the assembly may be simplified and a manufacturing tolerance of the substrate 140 may be minimized.

That is, since it is possible to prevent displacement of the substrate 140 caused by various factors, more stable vibrations can be achieved.

Figure 8:
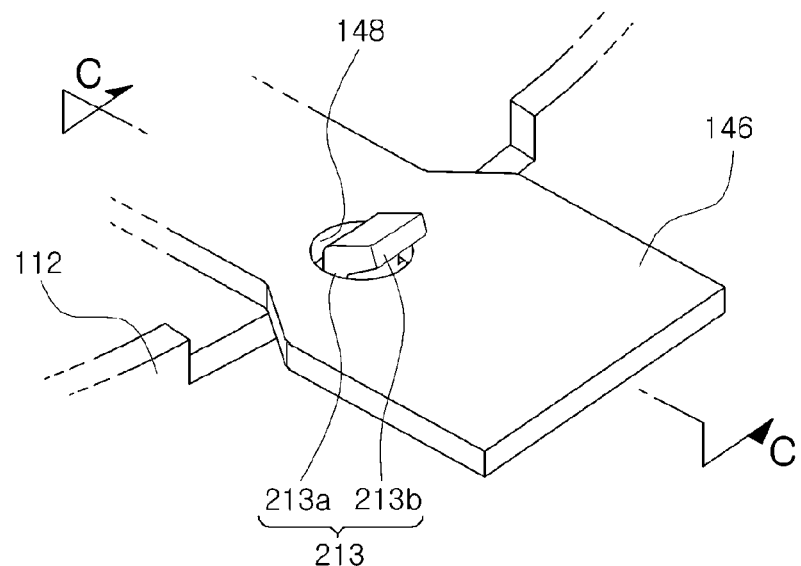
FIG. 8 is a schematic perspective view illustrating another embodiment of X of FIG. 5.
Figure 9:
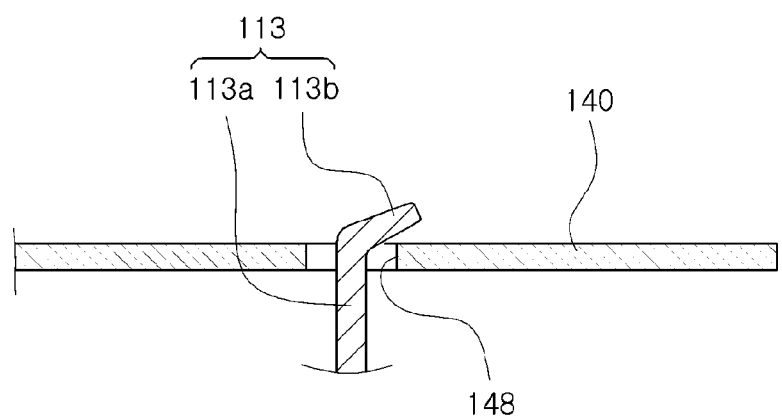
FIG. 9 is a schematic cross sectional view taken along line C-C of FIG. 8.

FIG. 8 is a schematic perspective view illustrating another embodiment of X of FIG. 5, and FIG. 9 is a schematic cross sectional view taken along line C-C of FIG. 8.

Referring to FIGS. 8 and 9, a connection protrusion 213 formed on the case 112 of the fixed part 110 may include an insertion portion 213a to be placed in the connection hole 148 formed in the substrate 140, and a locking portion 213b bent from an end of the insertion portion 213a in the outer diameter direction by a predetermined angle and protruding outwardly of the connection hole 148.

The locking portion 213b may have a gradually reduced thickness toward an end thereof, and the thickness thereof may be smaller than that of the insertion portion 213a.

Such a characteristic is associated with a manufacturing process, and the thickness of the locking portion 213b may be reduced when the end of the insertion portion 213a is subjected to a bending process together with a forging process in order to form the locking portion 213b.

Since the locking portion 213b is bent from the end of the insertion portion 213a to the outside of the connection hole 148, the substrate 140 is prevented from being separated from the case 112 by the locking portion 213b after the connection protrusion 213 including the locking portion 213b is inserted into the connection hole 148.

In addition, the locking portion 213b is bent from the end of the insertion portion 213a in the outer diameter direction in FIGS. 8 and 9. However, the present invention is not limited thereto, and the locking portion 213b may be bent in the inner diameter direction.

Figure 10:
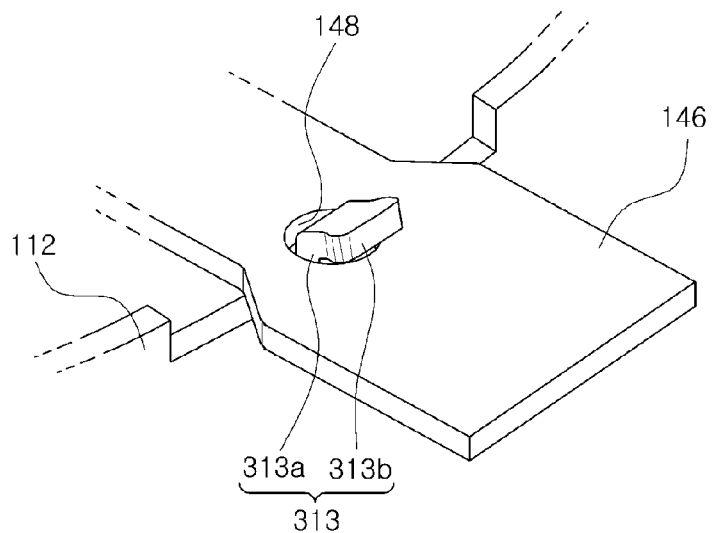
FIG. 10 is a schematic perspective view illustrating another embodiment of X of FIG. 5.
Figure 11:
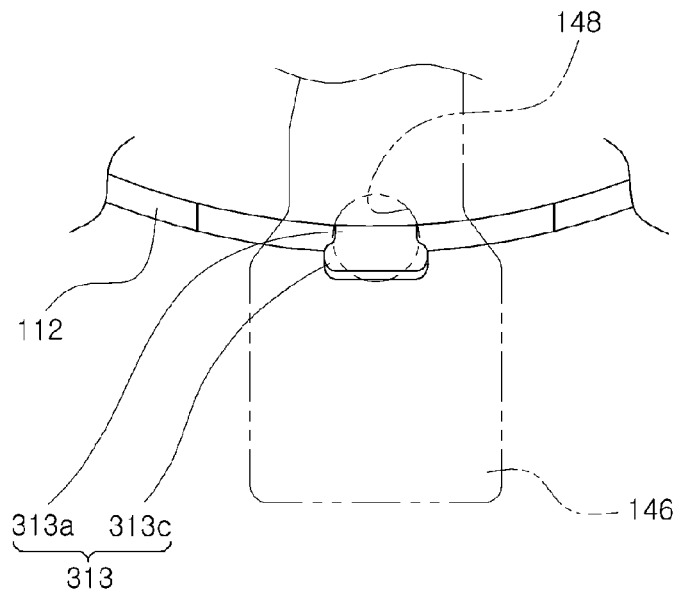
FIG. 11 is a schematic plane view viewed from Y of FIG. 10.
Figure 12:
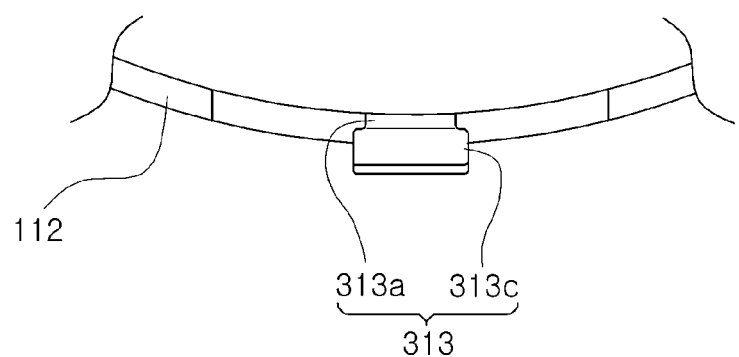
FIG. 12 is a schematic plane view illustrating a modified example of a locking portion viewed from Y of FIG. 10.
Figure 13A:
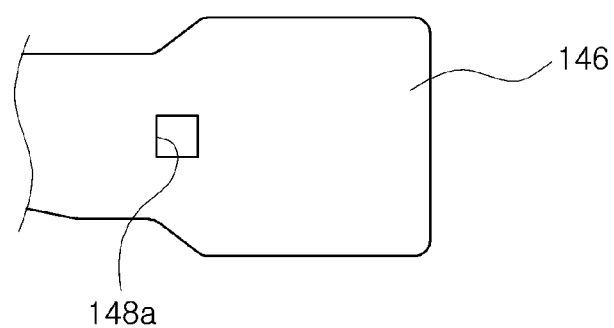
FIGS. 13A through 13D are schematic plane views illustrating modified examples of a connection hole formed in the substrate.
Figure 13B:
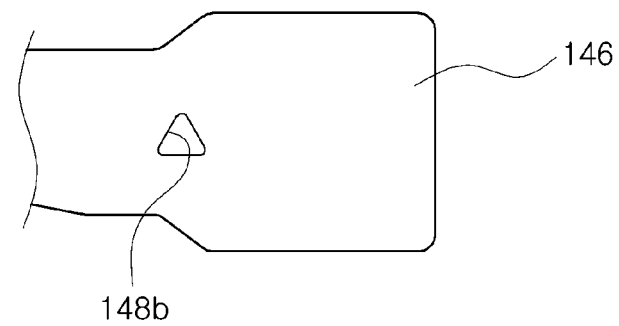
Figure 13C:
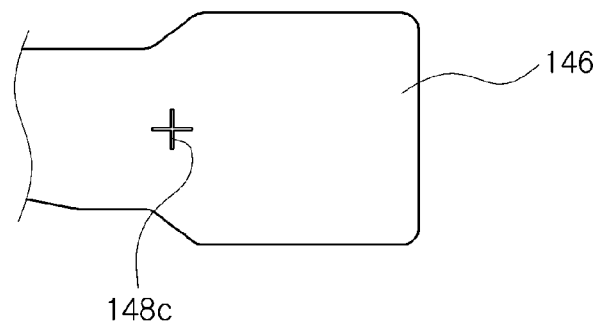
Figure 13D:
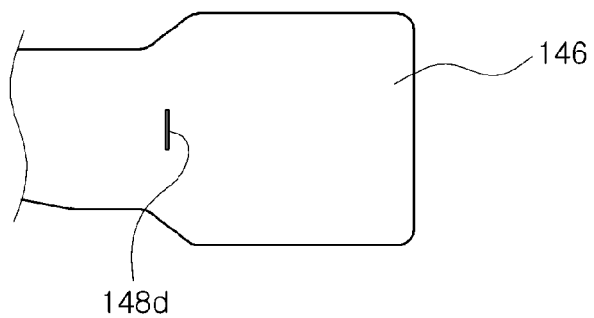

FIG. 10 is a schematic perspective view illustrating another embodiment of X of FIG. 5, FIG. 11 is a schematic plane view viewed from Y of FIG. 10, and FIG. 12 is a schematic plane view illustrating a modified example of the locking portion viewed from Y of FIG. 10.

Referring to FIGS. 10 through 12, locking portions 313b and 313c of a connection protrusion 313 formed on the case 112 of the fixed part 110 are the same as the locking portion 213b shown in FIGS. 8 and 9, except for their end shapes. Therefore, an explanation of elements other than the end shapes of the locking portions 313b and 313c will be omitted.

The locking portions 313b and 313c may be bent from the end of the insertion portion 313a in the outer diameter direction by a predetermined angle and may protrude outwardly of the connection hole 148, and ends thereof may be larger than the diameter of the connection hole 148.

The end shape of the locking portions 313b and 313c may be rounded as shown in FIGS. 10 and 11 or may be angled as shown in FIG. 12.

However, the end shapes of the locking portions 313b and 313c shown in FIGS. 10 through 12 are merely examples, and may be varied according to a designer's intention.

Due to the structure in which the locking portions 313b and 313c protrude outwardly of the connection hole 148 while being bent in the outer diameter direction, and their ends are larger than the diameter of the connection hole 148, the fixing force between the substrate 140 and the case 112 of the fixed part 110 may be maximized.

Accordingly, after the connection protrusion 313 including the locking portions 313b and 313c is inserted into the connection hole 148, the substrate 140 is prevented from being separated from the case 112 by the locking portions 313b and 313c.

In addition, the locking portions 313b and 313c are bent from the end of the insertion portion 313a in the outer diameter direction as in FIGS. 10 through 12. However, the present invention is not limited thereto, and the locking portions 313b and 313c may be bent in the inner diameter direction.

FIGS. 13A through 13D are schematic plan views illustrating modified examples of the connection hole formed in the substrate.

Referring to FIGS. 13A through 13D, the cross section of the connection hole 148a, 148b, 148c, or 148d formed in the fixed piece 146 of the substrate 140 may have a polygonal cross section such as a quadrangle or a triangle, a cross-shaped cross section, or a linear cross section in a radial direction.

However, the cross section of the connection hole 148a, 148b, 148c, or 148d shown in FIGS. 13A through 13D are merely an example and may be varied according to a designer's intention.

Figure 14:
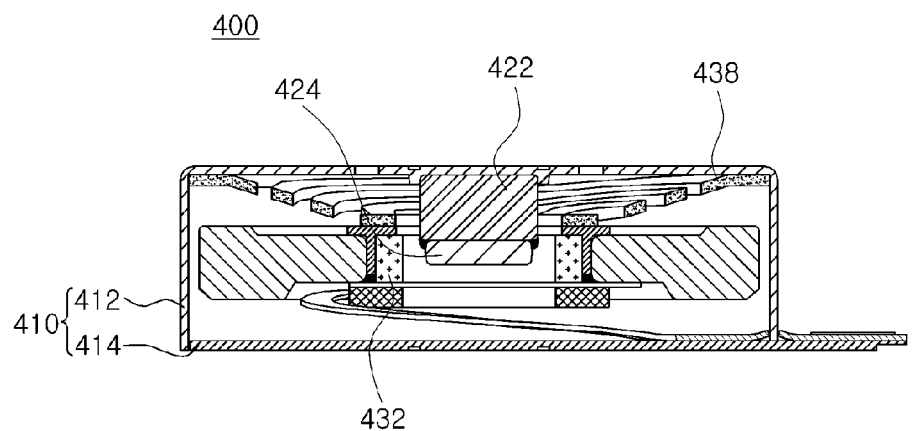
FIG. 14 is a schematic cross sectional view illustrating a linear vibrator according to another embodiment of the present invention.

FIG. 14 is a schematic cross sectional view illustrating a linear vibrator according to another embodiment of the present invention.

Referring to FIG. 14, a linear vibrator 400 according to another embodiment of the present invention is the same as the linear vibrator 100 of the aforementioned embodiment except for forming positions of a magnet 422 and a yoke plate 424. Therefore, an explanation of elements other than the forming positions of the magnet 422 and the yoke plate 424 will be omitted.

The magnet 422 is connected to a fixed part 410. However, unlike in the linear vibrator 100 according to the aforementioned embodiment, the magnet 422 may be connected to an inner sealing surface of a case 412 rather than a bracket 414 of the fixed part 410.

Accordingly, an elastic member 438 may include a hole formed in a center portion thereof larger than an outer diameter of the magnet 422 to prevent contact with the magnet 422 during vertical vibrations thereof.

The yoke plate 424 may be connected to a lower surface of the magnet 422, which is one surface of the magnet 422, in order to allow the magnetic flux to flow smoothly into the magnet 422 through a coil 432, generating electromagnetic force by interacting with the magnet 422.

Figure 15:
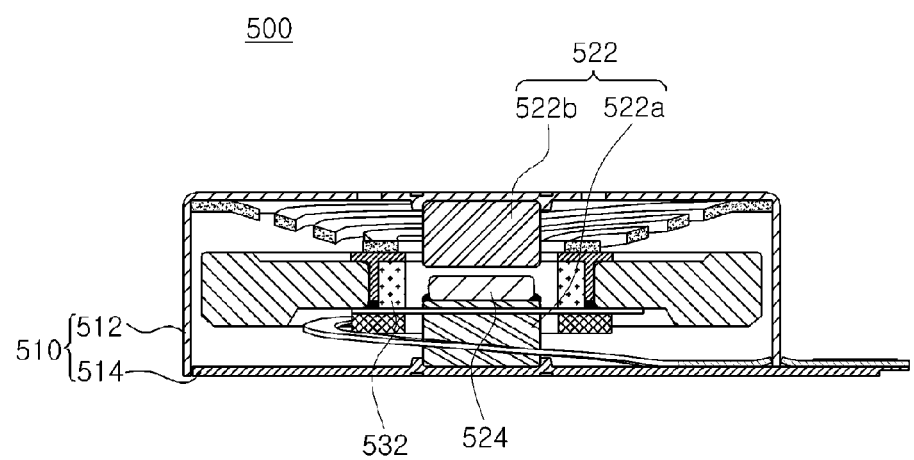
FIG. 15 is a schematic cross sectional view illustrating a linear vibrator according to another embodiment of the present invention.

FIG. 15 is a schematic cross sectional view illustrating a linear vibrator according to still another embodiment of the present invention.

Referring to FIG. 15, a linear vibrator 500 according to still another embodiment of the present invention is the same as the linear vibrator 100 according to the aforementioned embodiment in its configuration and effect, except for a magnet 522. Therefore, an explanation of elements other than the magnet 522 will be omitted.

The magnet 522 may include a first magnet 522a and a second magnet 522b.

The second magnet 522b may be formed in contact with an inner sealing surface of an upper portion of a case 512 of a fixed part 510, and the first magnet 522a may be connected to an upper surface of a bracket 514.

The first and the second magnets 522a and 522b may be cylindrical permanent magnets that are vertically magnetized to have different polarities in upper and lower portions and generate magnetic force of a predetermined magnitude to generate a magnetic field. The first and the second magnets 522a and 522b are fixed to the inner sealing surface of the upper portion of the case 512 and the upper surface of the bracket 514 by an adhesive.

The first and the second magnets 522a and 522b may have the same polarity facing each other to generate the magnetic force, and may be disposed away from each other.

Since magnetic force lines existing between the first and the second magnets 522a and 522b due to the same polarity facing each other may be spread in the outer diameter direction, magnetic efficiency is improved. In particular, the magnetic force is concentrated on a portion where a coil 532 disposed on outer circumferences of the first and the second magnets 522a and 522b is linked. Therefore, when the same electric current is consumed in the same volume, the first and the second magnets 522a and 522b generate a great deal of magnetic force compared to a single magnet and thus realize great vibrations.

However, the magnet 522 is not limited to the first and the second magnets 522a and 522b. At least two magnets having polarities facing each other may be used.

A yoke plate 524 may be connected to an upper surface of the first magnet 522a, which is one surface of the first magnet 522a, to allow magnetic flux to smoothly flow into the first magnet 522a through the coil 532, generating electromagnetic force by interacting with the first magnet 522a.

However, the yoke plate 524 may be disposed between the first magnet 522a and the second magnet 522b.

According to the above-described embodiments, the fixing force between the substrate 140 and the cases 112, 412, and 512 may be maximized due to the connection protrusions 113, 213, and 313 formed on the cases 112, 412, and 512 of the fixed parts 110, 410, and 510 and the connection holes 148, and 148a-148d formed in the fixed piece 146 of the substrate 140. Therefore, even in a case in which external impacts are applied to the substrate 140, the initial position of the substrate 140 may not changed. That is, the vibration performance and characteristic of the linear vibrators 100, 400, and 500 are not changed, even in a case in which the substrate 140, which is a vibrating element, vibrates.

Also, the linear vibrators 100, 400 and 500 of the present invention may guarantee maximal vibrations due to the maximization of the magnetic efficiency, and may obtain stable linear vibrations.

As set forth above, according to embodiments of the present invention, the linear vibrator can prevent the performance and characteristic from being changed by vibrating elements in advance.

In addition, maximal vibrations can be guaranteed by maximizing magnetic efficiency and the most stable linear vibrations can be obtained.

In addition, the magnetic efficiency can be maximized, while minimizing the space of the linear vibrator.

While the present invention has been shown and described in connection with the embodiments, it will be apparent to those skilled in the art that modifications and variations can be made without departing from the spirit and scope of the invention as defined by the appended claims.

What is claimed is:

1. A linear vibrator comprising:
a fixed part having an inner space of a predetermined size formed therein;
at least one magnet disposed in the inner space and generating magnetic force;
a vibration part including a coil disposed to face the magnet to generate electromagnetic force through interaction therewith, and a mass body;
a substrate having one end connected to the vibration part to serve as a free end, and the other end connected to the fixed part to serve as a fixed end; and
a connection protrusion formed on the fixed part and inserted into a connection hole formed in the substrate so as to allow the substrate to be fixed to the fixed part,
wherein the connection protrusion includes an insertion portion placed in the connection hole,
wherein the connection protrusion includes a locking portion bent from an end of the insertion portion in an inner diameter direction or an outer diameter direction by a predetermined angle, and protruding outwardly of the connection hole, and
wherein the locking portion is wider than the connection hole, to prevent the substrate from being separated from the fixed part.

2. The linear vibrator of claim 1, wherein the connection hole has a circular, polygonal, cross-shaped, or linear cross section in a radial direction.

3. The linear vibrator of claim 1, wherein the substrate includes a movable piece vibrating in association with the vibration part and a fixed piece extending from the movable piece to be connected with the fixed part, and
the connection hole is formed in the fixed piece.

4. The linear vibrator of claim 1, wherein the fixed part includes a case providing the inner space and having an exposed lower portion, and a bracket sealing the inner space, and
the magnet is connected with one surface of the bracket or one surface of the case.

5. The linear vibrator of claim 1, wherein the fixed part includes a case providing the inner space and having an exposed lower portion, and a bracket sealing the inner space, and
the magnet is provided in plural, each of the plurality of magnets being connected with one surface of the case or one surface of the bracket.

6. The linear vibrator of claim 1, further comprising a damper connected to one surface of the substrate to prevent contact between the vibration part and the fixed part due to a vibration of the vibration part.

7. The linear vibrator of claim 1, further comprising a yoke plate formed on at least one surface of the magnet and allowing a magnetic flux to smoothly flow into the magnet through the coil.

* * * * *